W. J. McADAMS.
GRAIN DRILL ATTACHMENT.
APPLICATION FILED OCT. 29, 1915.

1,222,644.

Patented Apr. 17, 1917.

Witness
M. A. Jones

Inventor
William J. McAdams,
By

UNITED STATES PATENT OFFICE.

WILLIAM J. McADAMS, OF SPURLOCK, TEXAS.

GRAIN-DRILL ATTACHMENT.

1,222,644.  Specification of Letters Patent.  Patented Apr. 17, 1917.

Application filed October 29, 1915. Serial No. 58,530.

*To all whom it may concern:*

Be it known that I, WILLIAM J. Mc-ADAMS, a citizen of the United States, residing at Spurlock, in the county of Sherman and State of Texas, have invented certain new and useful Improvements in Grain-Drill Attachments, of which the following is a specification.

My invention relates to improvements in grain drills, more in the nature of a combined plow and grain drill, and the main object of the same is to provide an effective drill through the use of which furrows may be formed and sufficient soil left for subsequent turning to cover the seed effectively so that the seed will not be uncovered even should a portion of the soil be blown away, but will remain well planted and covered in the soil. With the present device one half of the soil usually turned as the furrow is not turned until the seeds are planted. In this way the covering soil is turned but once and is not unduly pulverized so as to be blown broadcast by the wind. In carrying out this main object I aim to provide a particular and improved construction of drill; one that is simple, has few and durable parts and can be manufactured at a minimum cost.

Another object is to provide a drill attachment that will produce a furrow without the ordinary ridges so that the winds will not scatter the soil unduly, and at the same time the furrows will effectively retain the rain and snow, or if there is excessive rain or moisture they will, when covered, shield the grain from the same.

An important feature is the provision of one or more furrow opening plows having substantially vertical landside edges, or constructed to produce a furrow with a vertical side and a central furrow covering plow mounted in the rear of the furrow-opening plows so as to subsequently effectively and simultaneously turn the remainder of the soil of the ordinary furrow slice into the seed supplied portions of the furrow.

With the foregoing and additional objects hereinafter appearing in view, I have devised one form of drill as illustrated in the accompanying drawings, in which:—

Figure 1:
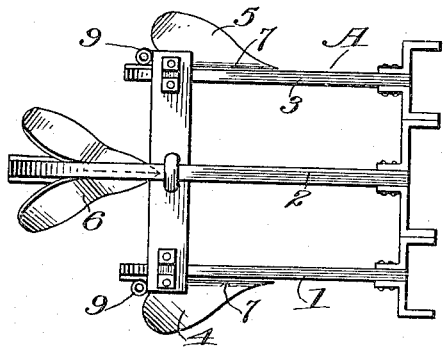
Figure 2:
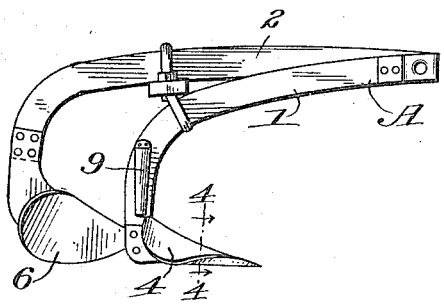
Figure 3:
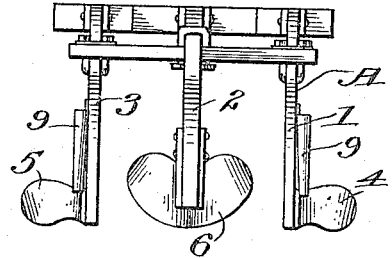
Figure 4:
Figure 5:

Figure 1 is a plan view,
Fig. 2 is a side elevation,
Fig. 3 is a rear elevation,
Fig. 4 is a bottom view of the furrow opener, and Fig. 5 is a detail section illustrating the shape of the furrow made by the furrow opening plow moldboard.

Referring specifically to the drawings wherein like character references designate like or corresponding parts, A generally designates a drill frame, essentially having beams 1, 2 and 3, extending rearwardly and supporting respectively furrow opening plows or moldboards 4 and 5 and furrow covering plow or moldboards 6.

My device may be used with any form of plows and it is therefore understood that I do not limit myself to moldboards as it can be as effectively used with disks.

Moldboard 4 is right-hand and moldboard 5 is left-hand. Each of these moldboards is provided with substantially vertical wall as at 7, on the landside, so as to produce a furrow similar to 8 in Fig. 4, having vertical wall and an inclined wall. When the furrow is thus formed and seed planted and uncovered, only one half of the soil usually turned has been turned and the soil therefore can not effectively be blown broadcast by the wind, nor can the soil be blown away leaving the seeds or roots bare, as the vertical wall of the furrow shields them from one direction and forms an abutment for them if the wind blows from the opposite direction.

Seed discharge tubes 9, are mounted at the rear of the moldboards 4 and 5, so as to convey seed to the furrows immediately after opening. The moldboard 6 is mounted in the rear of the moldboards 4 and 5, and is of such construction as to turn two furrow slices, one toward and into each furrow opened by the moldboards 4 and 5.

In use, means is provided as usual to supply seed at proper times through the tubes 9, but as this means forms no part of the present invention illustration thereof is omitted for clearness.

As the plow is drawn forward the moldboards 4 and 5 first open furrows of the shape seen at 8, and the seeds are then continually supplied to the tubes 9, falling into the furrows in the rear of the moldboards 4 and 5. Moldboard 6 then turns furrow slices simultaneously, one slice into each of the furrows containing the seed. It will be realized that during this operation the seeds are shielded by the particular form of furrow produced, against action of the wind, and if the season is unusually wet the seeds are sufficiently high on the side of the incline to keep them out of the undue moisture, or if the season is dry the furrows will retain any moisture for the benefit of the seeds. Also, as part of the soil is not turned until the seeds are planted, blowing away of the soil from the seeds or roots, even under high winds, does not occur. This is the important feature of the invention, and is designed to meet these unfavorable conditions.

As merely the preferred embodiment of the invention has been illustrated and described, it is to be understood that changes in the details of construction may be resorted to within the spirit and scope of the invention.

What I claim is:—

1. An agricultural implement having a plurality of mold boards with straight inner sides to produce furrows having a substantially vertical wall and a substantially inclined wall leading thereto, seed-distributing means mounted adjacent the mold boards and having the discharge ends disposed below the tops of the mold boards so that the seed may be deposited in the furrows without interference by the wind and will remain therein with the substantially straight wall of the furrow serving as abutments, and a shovel plow means disposed intermediate and coöperating with said mold boards.

2. An agricultural implement having rearwardly and downwardly extending beams, a third beam disposed intermediate said beams and extending rearwardly and downwardly, a bar disposed below the third beam and above the first mentioned beam, means to secure the beams to said bar to provide a rigid frame structure, mold boards carried adjacent the lower ends of the first mentioned beams and having substantially straight inner sides or walls to provide furrows having substantially straight walls and inclined walls leading thereto, said distributing members carried by first mentioned beams and having their outlet ends disposed below the tops of said mold boards so that the seeds may be lodged in the furrows without interference by the wind in delivery and after deposited, the vertical walls of the furrows acting as abutments for seeds, and the third beam extending rearwardly beyond the first mentioned beams and at its lower end having a shovel plow supported thereon to coöperate with the said mold boards.

In testimony whereof I affix my signature in presence of two witnesses.

WILLIAM J. McADAMS.

Witnesses:
J. W. LANCASTER,
J. T. BROWN.

Copies of this patent may be obtained for five cents each, by addressing the "Commissioner of Patents, Washington, D. C."